United States Patent [19]

Pugh

[11] Patent Number: 4,685,243
[45] Date of Patent: Aug. 11, 1987

[54] TROTLINE REEL AND HOOK HOLDER

[76] Inventor: Calvin H. Pugh, P.O. Box 387, Blanco, N. Mex. 87412

[21] Appl. No.: 935,965

[22] Filed: Nov. 28, 1986

[51] Int. Cl.$^4$ ............................................. A01K 97/00
[52] U.S. Cl. .................................................... 43/57.3
[58] Field of Search ....................................... 43/57.3

[56] References Cited

U.S. PATENT DOCUMENTS 1,634,030  6/1927  Korkames ............................ 43/57.3
2,804,716  9/1957  Adkison ............................... 43/57.3
4,546,569  10/1985  Thompson .......................... 43/57.3

Primary Examiner—M. Jordan

[57] ABSTRACT

This trotline reel and hook holder prevents entanglement of hooks and keeps them in a uniform fashion. Primarily, it consists of a yoke secured to a fishing reel and having a split-sleeve attached with a handle and rod combination. The rod of the combination retains a plurality of fish hooks uniformly in the sleeve, and the shanks of the hooks extend from a longitudinal slot in the sleeve.

5 Claims, 3 Drawing Figures

U.S. Patent    Aug. 11, 1987    4,685,243
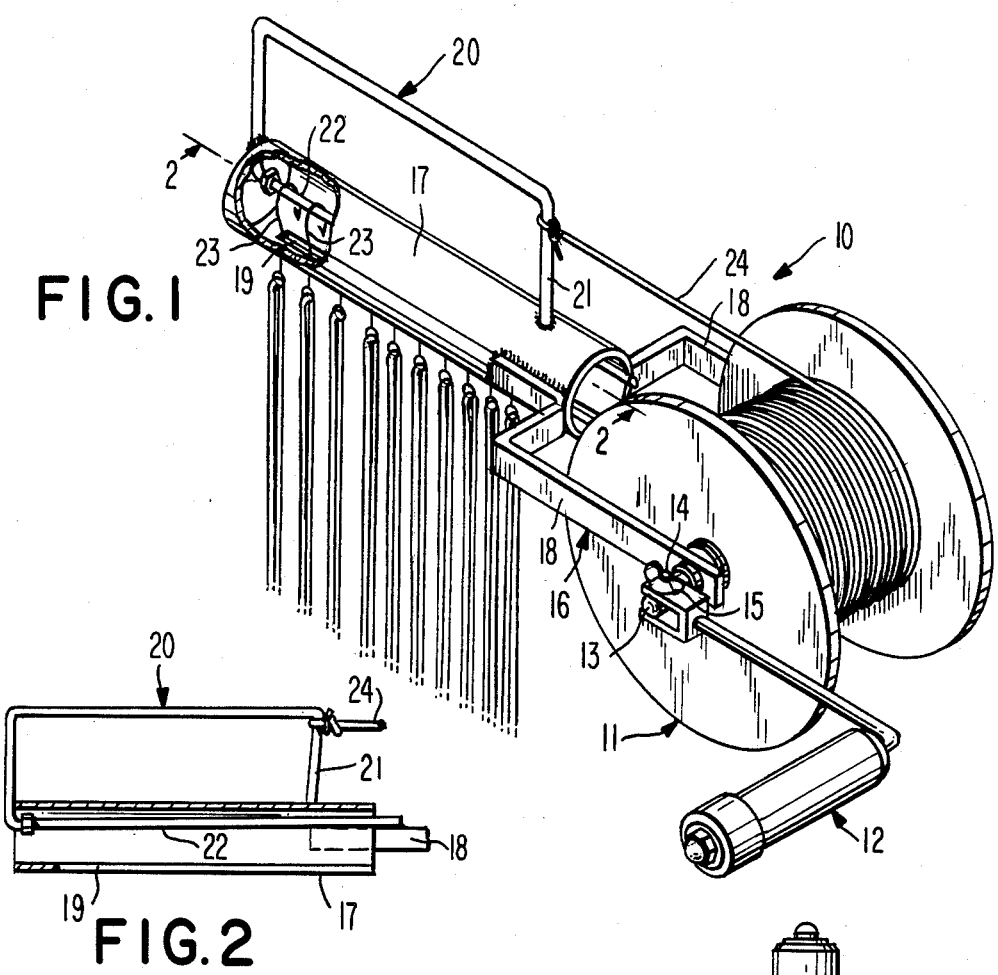
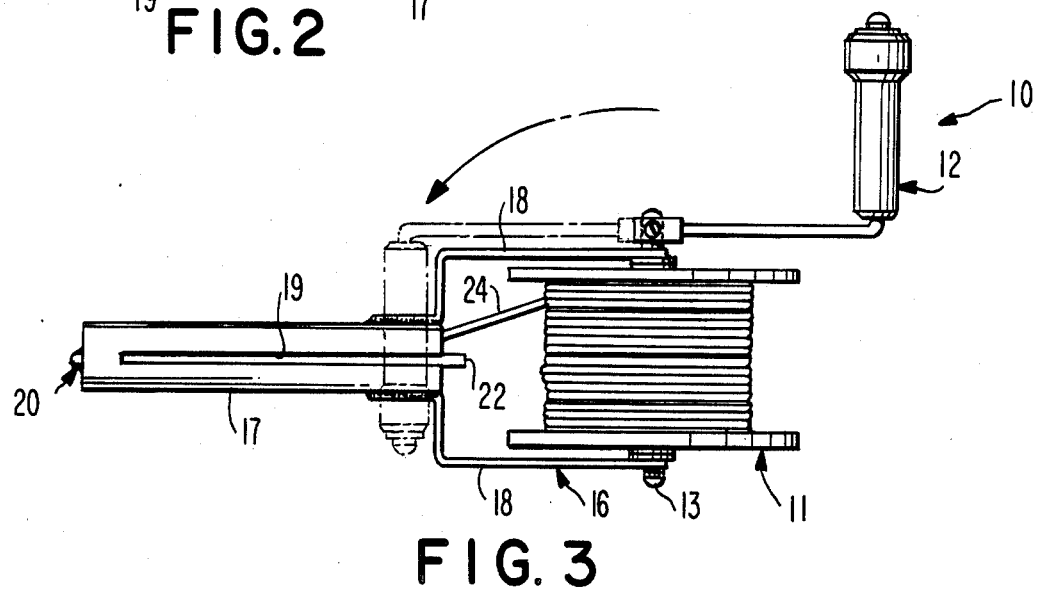

TROTLINE REEL AND HOOK HOLDER

BACKGROUND OF THE INVENTION

1. Field of the Invention

This invention relates to fishing reels, and more specifically, to a trotline reel and hook holder.

2. Description of Prior Art

References of record are the U.S. patents of William W. Homoky U.S. Pat. No. 2,531,816, Flavil H. Griggs U.S. Pat. No. 3,201,890, Alvin L. Shook U.S. Pat. No. 3,466,785, and Thomas B. Shultz U.S. Pat. No. 3,818,625.

The principal object of this invention is to provide a trotline reel and hook holder, which will be of such design, as to eliminate the entanglement and frustration often experienced when fishing with a trotline.

Another object of this invention is to provide a trotline reel and hook holder, which will be of such design, as to hold a plurality of hooks, short bait lines, and line clips, safely and uniformly in sequence, and the spool will hold approximately five-hundred feet of conventional trotline.

SUMMARY OF THE INVENTION

A trotline reel and hook holder, comprising a yoke secured to the reel portion and having a split-sleeve secured thereto with a handle and rod combination, the rod of the combination, serving as retaining means for the plurality of fish hooks.

BRIEF DESCRIPTION OF THE DRAWINGS

FIG. 1 is a perspective view of the present invention, shown partly in section;

FIG. 2 is a cross-sectional view, taken along the line 2—2 of FIG. 1, and

FIG. 3 is a bottom plan view of the invention, showing the hooks removed therefrom, and illustrating the handle's folding position in phantom lines;

DETAILED DESCRIPTION

Accordingly, a holder 10 is shown to include a reel 11 with a folding crank 12 fastened to the shaft 13 by a bolt fastener 14 and a wing nut 15. A yoke 16 is also received on the shaft 13, and a sleeve 17 is fixedly secured at one end, between the arms 18 of yoke 16. A longitudinal cut-out slot 19 is provided through sleeve 17 almost to its front end, for a purpose, which hereinafter will be described.

A handle and rod combination 20 is provided and one end of the handle portion 21 engages with the outer periphery of sleeve 17, and the opposite end which forms the rod portion 22, extends through sleeve 17. A plurality of fish hooks 23 are removably received on the rod portion 22 and the shanks of the hooks 23 are retained uniformly within the longitudinal cut-out slot 19 of sleeve 17. The line 24 of reel 11 is secured to handle portion 21 for retainment.

In operation, the line 24 is reeled off of its spool and the hooks 23 are slid off of the rod portion 22 of combination 20, and are baited and clipped onto the line 24.

While various changes may be made in the detail construction, such details will be within the spirit and scope of the present invention, as defined by the appended claims.

What I now claim is:

1. A trotline reel and hook holder, comprising, a yoke, said yoke attached to a sleeve at one end and means attached to the other yoke end for holding a fishing reel, a combination handle and rod received by said sleeve and means on the sleeve for retaining the shanks of a plurality of fish hooks received on said rod in said sleeve.

2. A trotline reel and hook holder as set forth in claim 1, wherein said yoke includes a pair of arms and one end of each arm of said pair is received on the ends of a shaft of a spool of a fishing reel.

3. A trotline reel and hook holder as set forth in claim 2, wherein the other end of each said arm is fixedly secured to the outer peripheral surface of said sleeve, and an end of said handle of said combination, engages with said outer peripheral surface, and one end of the fishing line of said fishing reel is removably secured to said handle, retaining said combination.

4. A trotline reel and hook holder as set forth in claim 3, wherein the rod of said combination is integrally attached to said handle and is removably received in said sleeve and retains said plurality of hooks within said sleeve.

5. A trotline reel and hook holder as set forth in claim 4, wherein the shanks of said hooks are freely received in a longitudinal cut-out slot provided through said sleeve, the slot providing uniform retainment means for said shanks of said hooks and preventing entanglement of the leaders of said hooks.

* * * * *